(12) United States Patent
Arsid

(10) Patent No.: US 11,748,802 B2
(45) Date of Patent: Sep. 5, 2023

(54) ORDERING AND PURCHASING SYSTEM USING TEXT/SMS MESSAGING

(71) Applicant: Dinesh Kumar Arsid, Lakewood, CA (US)

(72) Inventor: Dinesh Kumar Arsid, Lakewood, CA (US)

(73) Assignee: TINY PLANET INC, La Palma, CA (US)

( * ) Notice: Subject to any disclaimer, the term of this patent is extended or adjusted under 35 U.S.C. 154(b) by 1030 days.

(21) Appl. No.: 15/811,559

(22) Filed: Nov. 13, 2017

(65) Prior Publication Data

US 2019/0147524 A1     May 16, 2019

(51) Int. Cl.
```
G06Q 30/00        (2023.01)
G06Q 30/0601      (2023.01)
G06Q 20/32        (2012.01)
G06Q 20/12        (2012.01)
G06F 16/955       (2019.01)
H04M 1/72436      (2021.01)
H04M 1/72445      (2021.01)
H04L 61/4594      (2022.01)
```

(52) U.S. Cl.
CPC ..... *G06Q 30/0635* (2013.01); *G06F 16/9566* (2019.01); *G06Q 20/12* (2013.01); *G06Q 20/3255* (2013.01); *G06Q 30/0621* (2013.01); *H04M 1/72436* (2021.01); *H04M 1/72445* (2021.01); *H04L 61/4594* (2022.05)

(58) Field of Classification Search
None
See application file for complete search history.

(56) References Cited

U.S. PATENT DOCUMENTS

| | | | |
|---|---|---|---|
| 8,238,540 B1 * | 8/2012 | Duva | H04M 3/51 379/265.09 |
| 2011/0136516 A1 * | 6/2011 | Ellis | H04W 4/14 455/458 |
| 2014/0279094 A1 * | 9/2014 | Neighman | G06Q 20/4012 705/16 |
| 2016/0094491 A1 * | 3/2016 | Fedorov | H04L 12/56 709/206 |
| 2017/0169402 A1 * | 6/2017 | Atikoglu | G06Q 20/401 |

\* cited by examiner

*Primary Examiner* — Mila Airapetian
(74) *Attorney, Agent, or Firm* — TINY PLANET INC; Dinesh Kumar Arsid; Preeti Dinesh Asid

(57) ABSTRACT

A Method and a system which enables any device with text messaging capability to order at least one or plurality of products or services by sending a text or (SMS—Short Messaging Service) to a specific phone number (long code or short code) assigned to the store or chain of stores from which the products or services are ordered.

22 Claims, 26 Drawing Sheets

Welcome to store#ABC123. Click https://ptfv.us/abca for text order signup, coupons and $5 off on first order. Msg & data rates may apply. — 302

Ord#1234 $7.95 pay at store#ABC123 or approve with preset pmt method and complete order by text click for profile at https://ptfv.us/abcb — 304

Ord#1234 $7.95 approve by texting confirmation word/code or click https://ptfv.us/abcc1 or review and approve at https://ptfv.us/abcc — 306

Ord#1234 will be ready in XX minutes, please pick up at store#ABC123 for map and more info click on https://ptfv.us/abcd — 308

Ord#1234 will be delivered in XXX minutes at your address#001 for tracking and more info, click on https://ptfv.us/abce — 310

Welcome to store#ABC123. For detailed menu and to order online click on https://ptfv.us/abcf — 312

FIG. 3A

Payment of $999.99 is charged for ord#1234 to your preset account#1 receipt is sent to your email and is at https://ptfv.us/abcg ⟋ 314

Payment of $999.99 is paid to store#ABC123 using your preset account#1 receipt is sent to your email and is at https://ptfv.us/abch ⟋ 316

Welcome to ABC restaurant; you can book your table at this restaurant by clicking at https://ptfv.us/abci ⟋ 318

Welcome to ABC services; you can book your appointment for service by clicking at https://ptfv.us/abcj ⟋ 320

Welcome to ABC food services; you can book your table or appointment in zip code requested by clicking at https://ptfv.us/abck ⟋ 322

FIG. 3B

| To order 1S and 2M from any of the stores end user without predefined profile would send text to 1-THIS IS CHAI or 1-844-747-2424 and pay at store — 512 |

| Store id | End user sent Text | End user received Text |
|---|---|---|
| XYZ1 | 1S,2M@XYZ1 | Ord#1231 $7.90 pay at XYZ1 store or approve with text by creating profile at https://ptfv.us/abc1 — 514 |
| 1001 | 1S,2M@1001 | Ord#1232 $7.95 pay at 1001 store or approve with text by creating profile at https://ptfv.us/abc2 — 516 |
| 1002 | 1S,2M@1002 | Ord#1233 $8.85 pay at 1002 store or approve with text by creating profile at https://ptfv.us/abc3 — 518 |

FIG 5B

To order 1S and 2M from any of the stores end user with predefined profile with preset default store as 1002 would send text to 1-THIS IS CHAI or 1-844-747-2424 and pay with preset payment method — 520

| Store id | End user sent Text | End user received Text |
|---|---|---|
| XYZ1 | 1S,2M@XYZ1 | Ord#1234 $7.90 approve by text or review and approve at https://ptfv.us/abc4 |
| | Confirm | Ord#1234 will be ready in XX minutes for pick up at store XYZ1 for map and more info click at https://ptfv.us/abc7 |

— 522

| 1001 | 1S,2M@1001 | Ord#1235 $7.95 approve by text or review and approve at https://ptfv.us/abc5 |
|---|---|---|

End user clicks the link which opens a mobile optimized web page and popup to enter the PIN, user enters the PIN and changes the order details on web page and submits the order.

| | | Ord#1235 will be ready in XX minutes for pick up at store 1001 for map and more info click at https://ptfv.us/abc8 |
|---|---|---|

— 524

| 1002 | 1S,2M | Ord#1236 $8.85 approve by text or review and approve at https://ptfv.us/abc6 |
|---|---|---|
| | Yes | Ord#1236 will be ready in XX minutes for pick up at store 1002 for map and more info click at https://ptfv.us/abc9 |

User Profile

| | |
|---|---|
| First Name | |
| Middle Name | |
| Last Name | |
| Address 1 | |
| Address 2 | |
| City | |
| State | |
| Zip Code | |
| Country | |
| Address Id | 01   ☐ Default    [Add more addresses] |
| Phone 1 | |
| Phone 2 | |
| Email 1 | |
| Email 2 | |
| PIN | |
| Password | |

[Phone and Stores]  [Menu Items]  [Payment Details]

[Submit]

FIG. 6A

User Additional Addresses

Address 1
Address 2
City
State
Zip Code
Country
Address Id  02   ☐ Default    [ Add more addresses ]

[ Submit ]

FIG. 6B

Phones and Stores for User

Text Order Phone Numbers:
- 1-THIS IS WASH (1-844-747-9274)
- 1-THIS IS LAWN (1-844-747-5296)
- 1-THIS BARBER (1-844-722-7237)
- 1-THIS HAIRCU T (1-844-742-4728)
- 1- THIS STYLIS T (1-844-778-9547)
- 1- THIS IS CHEF (1-844-747-2433)

| Field | Value | Option |
|---|---|---|
| Store Name | XYZ Chai California | ☐ Customize |
| Store Id | XYZ1 | ☐ Customize |
| Store Location | 1234 Any street, Any city CA 77777 | ☐ Default Store |
| Confirmation Word/Code | yes | ☐ Customize |

[XYZ1 Menu]

| Field | Value | Option |
|---|---|---|
| Store Name | Multi Chai Store Arizona -1 | ☐ Customize |
| Store Id | 1001 | ☐ Customize |
| Store Location | 1234 Any street, Any city AZ 88868 | ☐ Default Store |
| Confirmation Word/Code | yes | ☐ Customize |

[1001 Menu]

| Field | Value | Option |
|---|---|---|
| Store Name | Multi Chai Store Arizona - 2 | ☐ Customize |
| Store Id | 1002 | ☐ Customize |
| Store Location | 1234 Any street, Any city AZ 99999 | ☑ Default Store |
| Confirmation Word/Code | yes | ☐ Customize |

[1002 Menu]

[Submit]

FIG. 6C

User Menu Items that can be ordered

Text Order Phone Numbers:
- 1-THIS IS WASH (1-844-747-9274)
- 1-THIS IS LAWN (1-844-747-5296)
- 1-THIS BARBER (1-844-722-7237)
- 1-THIS HAIRCU T (1-844-742-4728)
- 1- THIS STYLIS T (1-844-778-9547)
- 1- THIS IS CHEF (1-844-747-2433)

Stores of Selected Number:
- 1001 - Multi Chai Store Arizona-1
- 1002 - Multi Chai Store Arizona-2

Store Name: XYZ Chai California ☐ Customize
Store Id: XYZ1 ☐ Customize
Store Location: 1234 Any street, Any city CA 77777 ☐ Default Store

| Item id | Item nick name | Item description | Item Price | Options | Customize |
|---|---|---|---|---|---|
| 1S | 1S-Small | Regular Tea | $2.95 | No Milk / Whip Cream / Extra Suger / Half and Half | ☐ |
| #1M | 1M - Medium | Regular Tea | $3.95 | Whip Cream / Extra Suger / Half and Half | ☑ |
| 1L | 1L -Large | Regular Tea | $4.95 | No Milk / Whip Cream / Extra Suger / Half and Half | ☐ |
| 2S | 2S-Small | Special Tea | $3.95 | No Milk / Whip Cream / Extra Suger / Half and Half / Add cinnamon | ☐ |
| 2M | 2M-Medium | Special Tea | $4.95 | No Milk / Whip Cream / Extra Suger / Half and Half / Add cinnamon | ☐ |
| 2L | 2L-Large | Special Tea | $5.95 | No Milk / Whip Cream / Extra Suger / Half and Half / Add cinnamon | ☐ |

[Submit]

User Order

| | |
|---|---|
| Order ID | 12345 |
| Order Phone Number | 1-THIS IS CHAI (1-844-747-2424) |
| Store Name | Multi Chai Store Arizona -1 ☐ Customize |
| Store Id | 1001 ☐ Customize |
| Store Location | 1234 Any street, Any city AZ 88888 ☐ Default Store |

| Item id | Item nick name | Item description | Item Price | Options | Customize for this order only | Customize for future | |
|---|---|---|---|---|---|---|---|
| 1S | 1S-Small | Regular Tea | $2.95 | No Milk / Whip Cream / Extra Suger / Half and Half | ☐ | ☐ | Delete |
| 2M | 2M-Medium | Special Tea | $4.95 | No Milk / Whip Cream / Extra Suger / Half and Half / Add cinnamon | ☐ | ☐ | Delete |

[Add More Items]

[Submit To Approve and Pay]

FIG. 6F

User Zip Code Text Results

Change the zip code or location [            ]  [ Submit ]

Results for location/Zip Code 77777

Store Name    [XYZ Chai California]
Store Id      [XYZ1]
Store Location [1234 Any street, Any city CA 77777]

[ XYZ1 Menu to Order ]   [ Reserve a Table ]

Store Name    [Multi Chai Store California -22]
Store Id      [1022]
Store Location [1234 Any street, Any city CA 77777]

[ 1022 Menu to order ]   [ Reserve a Table ]

Store Name    [Multi Chai Store California - 23]
Store Id      [1023]
Store Location [1234 Any street, Any city CA 77778]

[ 1023 Menu to order ]   [ Reserve a Table ]

FIG. 6G

User Order History

Note: To view the receipt click on the order ID

| Date | Order ID | Store ID | Order Phone Number | Order Total |
|---|---|---|---|---|
| 11/1/2017 | 12341 | XYZ1 | 1-THIS IS CHAI | $3.95 |
| 11/2/2017 | 12376 | 1002 | 1-THIS IS WASH | $14.95 |

When clicked on order id 12341 below receipt is shown

XYZ Chai California - Any City

12345 Any Street
Any city CA 77777
Phone: 555-555-5555

11/01/2017　　　　　　　　　　　　　　　8:52:10 PM
Order Id: 12341
Dine In
Employee: Employee Name 1  1S Regular Small Tea　　　　　　　　$ 2.95

Sub Total　　　　　　　　　　　　　　$ 2.95
Sales Tax　　　　　　　　　　　　　　$ 1.00
Order Total　　　　　　　　　　　　　$ 3.95

Paid by credit card on file

---> order is closed <---

XYZ Chai is best Chai in the town visit www.thisischai.com

FIG. 6H

Business Registration

Business Name: [ ]

Business Headquarter [Add Contacts]
Address 1: [ ]
Address 2: [ ]
City: [ ]
State: [ ]
Zip Code: [ ]
Country: [ ]
Phone 1: [ ]
Phone 2: [ ]
Email 1: [ ]
Email 2: [ ]
User Name: [ ]
Password: [ ]

Line of Business:
- Fast Food
- Fine Dining
- *(selected)*
- Salon – Women
- Salon – Unisex
- Car Wash
- Lawn Care
- Maid Services
- Spa Select one of the Available Numbers:
- 1-THIS BARBER (1-844-722-7237)
- 1-THIS HAIRCUT (1-844-742-4728)
- 1-THIS STYLIST (1-844-778-9547)

[Add Core Menu of Products or Services]  [Add Stores]

[Submit]

FIG. 7A

Add Store Operators and Contacts

| Field | Value |
|---|---|
| Assigned Phone Number | 1-THIS IS CHAI (1-844-747-2424) |
| Store Name | XYZ1 - XYZ Chai California |
| Store Id | XYZ1 |
| Store Location | 1234 Any street, Any city CA 77777 |
| First Name | |
| Middle Name | |
| Last Name | |
| Phone 1 | |
| Phone 2 | |
| Email 1 | |
| Email 2 | |
| User Type | Operator / Store Admin / Supervisor / Franchisor |
| User Name | |
| Password | |
| Address 1 | |
| Address 2 | |
| City | |
| State | |
| Zip Code | |
| Country | |

Submit

FIG. 7B

Store or Business Core Menu Items

Text Order Phone Number: 1-THIS IS CHAI (1-844-747-2424)

Select accessible Menu
Note: only business Admin and Store Admin can edit any Menu item: XYZ1 - XYZ Chai California Business Name: XYZ Corporation Store Name:

[Import from other Database]

| Item id | Item nick name | Item description | Item Price | Options | Quantity on Hand |
|---------|----------------|------------------|------------|---------|------------------|
| 1S | 1S-Small | Regular Tea | $2.95 | No Milk / Whip Cream / Extra Suger / Half and Half | 99999 |
| 1M | 1M - Medium | Regular Tea | $3.95 | No Milk / Whip Cream / Extra Suger / Half and Half | 99999 |
| 1L | 1L -Large | Regular Tea | $4.95 | No Milk / Whip Cream / Extra Suger / Half and Half | 99999 |
| 2S | 2S-Small | Special Tea | $3.95 | No Milk / Whip Cream / Extra Suger / Half and Half / Add cinnamon | 99999 |
| 2M | 2M-Medium | Special Tea | $4.95 | No Milk / Whip Cream / Extra Suger / Half and Half / Add cinnamon | 99999 |
| 2L | 2L-Large | Special Tea | $5.95 | No Milk / Whip Cream / Extra Suger / Half and Half / Add cinnamon | 99999 |

[Submit]

FIG. 7C

Store Registration

| | |
|---|---|
| Assigned Phone Number | 1-THIS IS CHAI (1-844-747-2424) |
| Store Name | XYZ Chai California ☐ Customize |
| Store Id | XYZ1 ☐ Customize |
| Address 1 | 1234 Any Street |
| Address 2 | |
| City | Any City |
| State | CA |
| Zip Code | 77777 |
| Country | USA |
| Phone 1 | 555-555-5555 |
| Phone 2 | 666-666-6666 |
| Email 1 | xyz1@xyz.com |
| Email 2 | |
| State Sales Tax % | 8.25 |
| County Sales Tax % | 1.2 |
| City Sales Tax % | 3.5 |
| Store Admin User Name Password | |

[ Add Store Operators ]   [ Customize Store Menu ]

[ Submit ]

FIG. 7D

Store Order Screen

[Pending Orders] [Abandoned Orders] [My Orders] Time per Order [XX Min]

Paid Orders ready to process now

| Order # | Buyer Name | Item ID | Options | Status | Action |
|---|---|---|---|---|---|
| 12342 | John Doe | 1S | No Milk / Whip Cream / Extra Suger | In Works -Emp111 | [Change Status] |
| | | 2M | No Milk / Extra Suger / Half and Half | In Works -Emp111 | [Change Status] |
| 12341 | John Doe2 | 1L | No Milk / Extra Suger / Half and Half | Ready For Pickup | [Change Status] |
| 12340 | John Doe3 | 2S | No Milk / Whip Cream / Extra Suger | Delivered | [Change Status] |

FIG. 7E

Login Screen for Store Admin and Operators

| Assigned Phone Number | 18447472424 |
| Store Id | XYZ1 |
| User ID | |
| Password | |

FIG. 7F

Store Admin Dashboard

- 1. Store Menu
- 2. Store Users
- 3. Active Orders
- 4. Completed Orders
- 5. Pending Orders
- 6. Abandoned Orders
- 7. Amount Settled for Orders (by day, by week, by month)
- 8. Order Processing Fee and Other Fees
- 9. Sales Taxes Collected
- 10. Create/Manage Keywords
- 11. Create/Manage Coupons
- 12. Create/Manage Text Campaigns
- 13. Create/Manage Email Campaigns
- 14. Create/Manage Flyers
- 15. Create/Manage Landing Pages
- 16. Create/Manage Contacts
- 17. Create/Manage Templates
- 18. Create/Manage Loyalty Programs
- 19. Reports

FIG. 7G

KEYWORD AND WELCOME MESSAGE SETUP

FIG. 7H

ORDERING AND PURCHASING SYSTEM USING TEXT/SMS MESSAGING

BACKGROUND

Today's fast paced society demands simplified handling of routine tasks, quick responses, accurate transactions and at most personalization in almost all the products they buy or services they hire for. Using this invention, a user can solve the tedious task of going through the process of explaining their personal choices in ordering an item as simple as coffee with specific combination, or a pizza with variety of toppings, or combination of items they want together for an order. In essence user can customize the order for all combinations possible for every item a store offers. The invention also simplifies the ordering processes without having to wait in line or stop in drive through alley to order the food, or search websites, read reviews and decide the best service provider such as lawn mower or plumber who can attend to user's situation right away, or service provider who is very close to user's designated location. The invention further requires no mobile app, and with one phone number user can order from several related stores, or business entities with plurality of products or services.

The invention also saves lot of staff personnel time for stores to staff the cash register and manage the cash, payment processing, printing of receipts and associated overhead. Stores eventually can do without attendant at counter or do without cash register. Staff personnel time is saved as well, since they no longer need to take order and confirm with the user. Accuracy of the store operation and customer satisfaction will increase as the invention is implemented in practice.

BRIEF SUMMARY OF INVENTION

The present invention allows any text enabled device (cell phone, mobile phone, smart phone, and PDA) to order plurality of products or services by sending a specific formatted text/SMS to a specific phone number which is assigned to the store among plurality of other stores and/or business entities conducting similar business activities.

The invention is green earth solution, where no receipt is printed, and also need no credit card handling after initial setup to order products or services, in essence user can leave the wallet at home and still can order products and services with help of mobile phone just with text messaging capability, and without talking to the attendant at ordering stall or counter or anyone at the store. It is completely autonomous process where user is in control of the ordering and store ordered from gets exact specification of order directly from the user, there is no middleman (store personnel at register to input order for user). User sends a simple text/SMS with store items or customized store items to order to a specific phone number that is assigned to the store by the system. The same phone number can be assigned to many such stores in similar line of business. After the order text/SMS is sent out by user, processing server verifies store, user, and inventory and prepares unpaid order information and sends back this information in a text/SMS to user. User can approve the order by simply texting/SMS a confirmation word/code/text defined by user in user profile or can modify the order and approve using a URL provided in the text/SMS. After approval by user, payment method is charged for the order amount and receipt with order details and pertinent information is sent to the user as a text/SMS/MMS URL and also in email. Order confirmation is also transmitted to the designated store, order is prepared and will be ready for pick up or delivery as required by the user. User also retains all the receipts from all the stores ordered from, using the assigned phone number to those stores in electronic format in order history.

BRIEF DESCRIPTION OF THE FIGURES

Non-limiting and non-exhaustive embodiments of the present invention are described with reference to the following figures/drawings. In the figures/drawings, like reference numerals refer to like parts throughout the various figures unless otherwise specified.

For a better understanding of the present invention, reference will be made to the following Detailed Description, which is to be read in association with the accompanying figures, wherein:

FIG. 3A and FIG. 3B are representative samples of various content elements of text received by end user mobile device in response to text sent out for ordering, approving and retrieving information from store assigned to a specific phone number.

FIG. 5A, FIG. 5B and FIG. 5C shows an example of a Tea/Chai store taking orders by text and serving with text responses to accomplish the entire sales transaction at store, without printing receipts.

FIG. 6A, FIG. 6B, FIG. 6C, FIG. 6D, FIG. 6E shows representative user profile creation screens.

FIG. 6F shows the representative screen of web order that can be modified by clicking on the URL received by user in text/SMS message.

FIG. 6G shows the representative screen of results web page when user texts a zip code to an assigned number in system to find the stores to order or interact with.

FIG. 6H shows the representative screen of order history page and receipt image of orders that user has placed by text/SMS message to any of the assigned phone numbers which are associated with any of the stores and business entities.

FIG. 7A, FIG. 7B, FIG. 7C, FIG. 7D show the representative screens for business entity registration, system phone number assignment, core menu creation and modification for individual stores and store registration.

FIG. 7E shows the representative screen of orders received by store and interactions with the order data at store.

FIG. 7F and FIG. 7G show the representative screens for store operator or admin or business entity user login and their dashboards with accessible menu items.

FIG. 7H shows the representative screen of keyword creation and text message that will be sent out for the users who text such keyword.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The meaning of "URL" or Uniform Resource Locator includes URL or Shortened URL. The meaning of "SMS" or Short Messaging Service includes "Text", "SMS", "MMS" or "Multimedia Messaging", and "IM" or Instant Messaging according to context it is used in. The meaning of "user" or "end user" is same and it is the individual or entity with any of text enabled and internet ready device such as cell phone, mobile phone, smart phone, or PDA, ordering products or services, unless explicitly defined otherwise.

It is further noted that the store id and the store's menu item ids along with item description and pricing are prominently displayed in store or menu card or any other prominently available printout/display/handout at the store or business establishment as in the current established practice.

Figure 1:
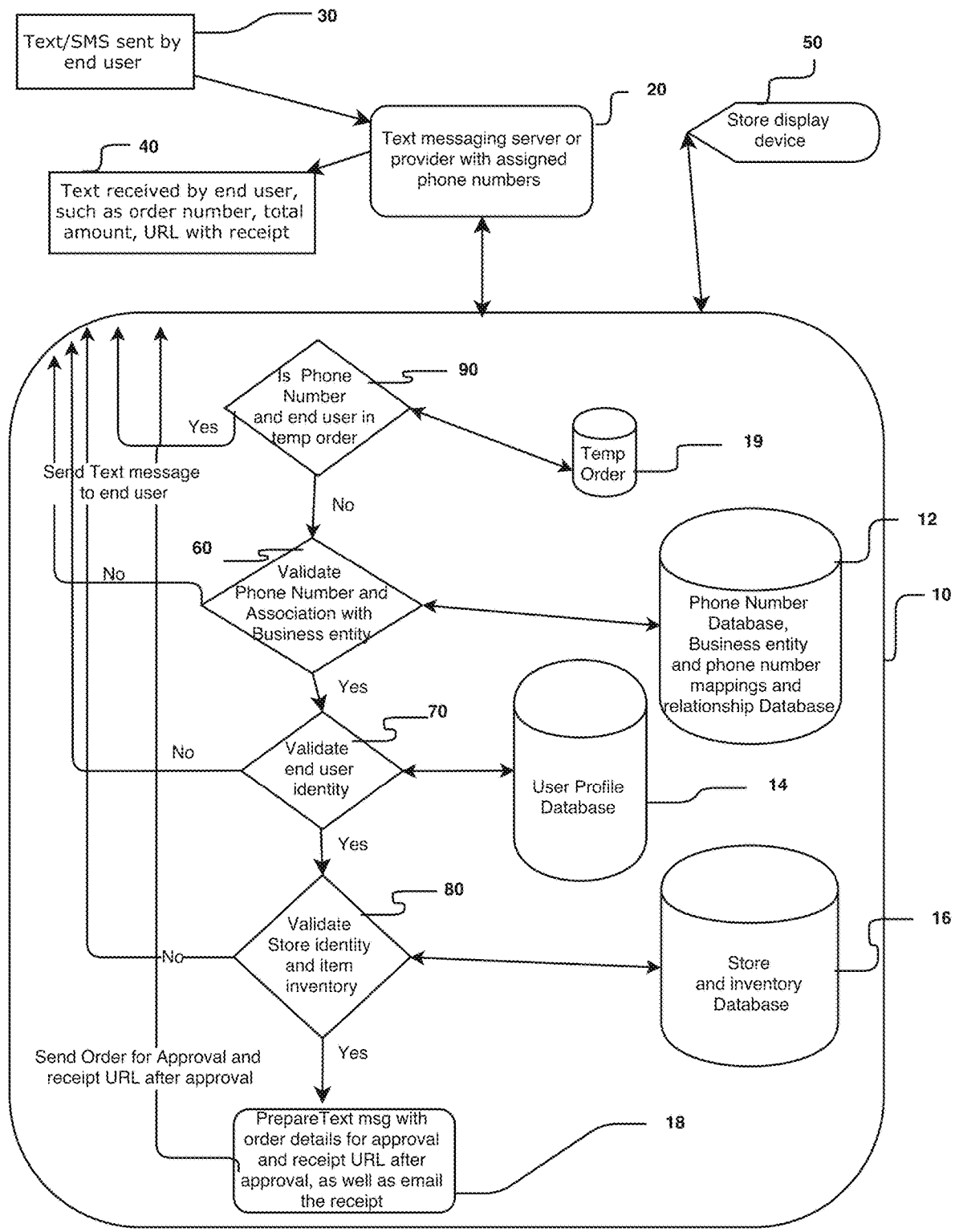
FIG. 1 is a process diagram of invention with sequence of steps and interaction between the end user mobile device sending and receiving text/SMS messages and the processing server's logic and components involved.
Figure 2:
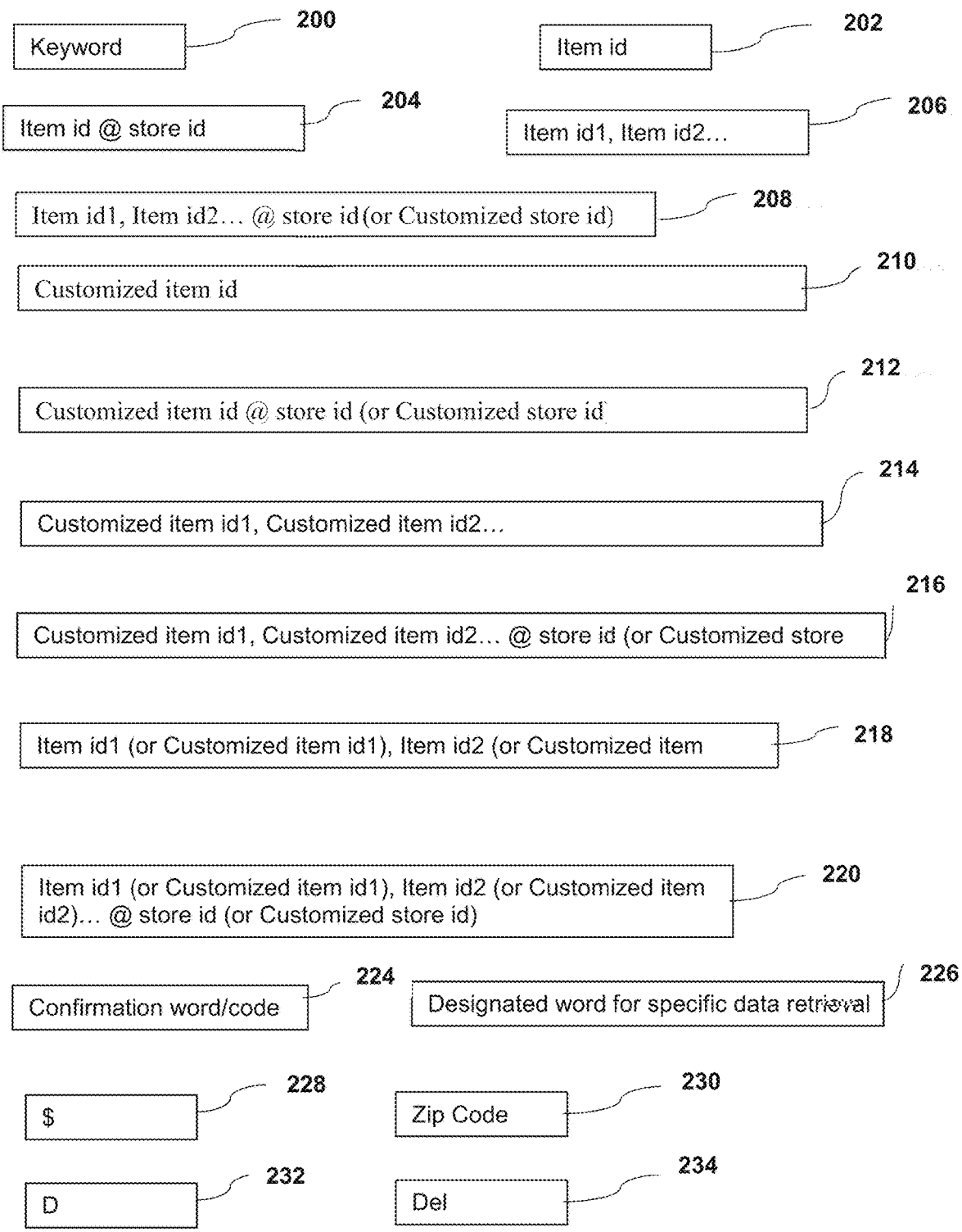
FIG. 2 is representative sample of various content elements of text sent out from end user mobile device to get coupons, create profile, order items, approve and retrieve information from store assigned to a specific phone number.

FIG. 1 shows components of one embodiment of an environment in which the invention may be practiced. FIG. 2 and FIG. 3A and FIG. 3B or elements in them are also referenced as needed. The variations in arrangement and type of the components may be made without departing from the spirit or scope of the invention. As shown, processing server 10 of FIG. 1 includes the database of the text enabled phone numbers (long code or short code or toll free or local or vanity or non-vanity phone numbers) 12, which are also configured, ported to, connected to text messaging server 20. There is connectivity between processing server 10 and text messaging server or text messaging provider 20 by means of API and/or other means to enable processing server 10 to receive incoming text messages to, or send out text messages from configured phone numbers which are part of database 12 and configured on text messaging server or provider 20. Such phone numbers are assigned to one or several business entities in same line of business conducting similar activities, with one or plurality of store locations, these business entities and store locations are also part of database 12.

When an end user sends out a text/SMS 30 using mobile device, or PDA or any other means, to one of the phone number in database 12 with any embodiment of the text content suggested by FIG. 2, such as text containing item id 202, this text message is received by processing server 10 and it validates if such phone number is assigned to at least one store location of any of the plurality of business entities in database 12, using logic block 60, once it validates the phone number and assignment of that phone number to business entity and store location thereof, it further validates the end user with logic block 70 against the user profile database 14. If there is no user profile exists, then a text message will be sent to prompt end user to create the profile. Processing server further validates the store location identity and inventory from database 16 using logic block 80 once validation are done, processing server prepares the order details text 18 and formats the required text message as one of the embodiments of the content from FIG. 3, in this case 304, this text message is received 40 by end user device and the order details as unpaid order is stored in temp order database 19 and is transmitted to the identified store location display device 50, this display device could be computer screen, PDA or another mobile device, to which the store admin or operator has already signed in to view the incoming orders.

End user now has to take the action to complete the order placed using text message. End user has option to create user profile, if no profile is found, further if end user does not want to create the profile, end user can still complete the order by paying the order amount provided as part of text message at that store location, or if profile is found then simple confirmation of order with user defined confirmation word 224 would be sufficient to charge the end user account with preset payment method.

Order approval is received by the processing server and is processed by logic block 90 to check the end user's phone number and assigned phone number against temp order database table 19. If found in temp database table and user does not have user profile then order has to be paid at store at which time store marks the order as paid. If user has profile then the order will be paid with preset payment method in profile for that store or business entity. After order is paid, the updated order information as paid order will be sent to the store on their display to prepare the order and end user will receive confirmation text such as 308 also the order record will be removed from temp database 19.

FIG. 2 is representative embodiment of content that is required to be sent from the end user's mobile device to interact with text ordering system setup for at least one of the plurality of business entity's store locations which are assigned the phone number from the processing server's phone database which is also configured on text messaging server or provider.

FIG. 3A and FIG. 3B are representative embodiment of the content that is sent to the end user's mobile phone device by processing server, and end user's mobile device receives these text messages at various interaction stages during ordering process using text/SMS messaging.

FIG. 2 depicts various text message content, of them 200 represents the keyword that a store location can provide to end user to sign up or create a profile, set defined payment method, customize items at store to order, and save such customization for future ordering, also it can be used for sending the promotional coupons to end user at times or the coupons can be delivered to end user when keyword is texted to the assigned phone number. A response to end user's text 200 could be 302 a message that prompts end user to sign up to order using text from the store which offered that keyword, besides setting up payment method. PIN, preferences and default store for that assigned number. End user can also customize the store id with user defined label or name besides the customizing item ids.

End user needs to create profile only once regardless of however many stores end user may interact and these stores could belong to one or plurality of business entities and can be assigned to one or plurality of assigned phone numbers. After creating the profile, if the end user interacts with any new assigned phone number on the system, processing server will automatically recognize the user and automatically adds the first store interacted or ordered from with such new assigned number as default store. End user can change the default store for any assigned number at any time by logging on to the system from website (www.premiumtollfreevanity.com or any other defined website) or by clicking on the profile link in any of the messages received by end user on user's mobile device such as 306, 308, 310, 312, 314, 316, 318, 320, 322 or also by texting a keyword such as "profile", or any other defined keyword, for such operation and receiving the profile link as response text/SMS and updating the profile.

When assigned phone number is assigned to plurality of stores and end user with or without profile is ordering first time to such an assigned phone number using text/SMS message, end user needs to define the store id prefixed with symbol "@" or any other defined symbol, following at least one or plurality of item ids being ordered separated by comma ",", or any other defined separator 204, if profile exists, following the order text being sent, processing server will add that store as default store for that assigned number in user profile of that end user.

Every time end user with profile wants to order items from non-default store for an assigned number in user profile, or end user without profile want to order items from any of the stores with system assigned phone number using text/SMS, end user needs to define the store id prefixed with '@', or any other defined symbol, following at least one or plurality of item ids being ordered separated by comma ",", or any other defined separator, using text messages as in 204, 208, 212, 216, 220. End user, in their profile can have customized items for both default and non-default stores for an assigned phone number.

When the default store is set for an assigned number, end user does not need to use symbol "@", or any other defined symbol, to identify the store, and can order at least one or plurality of items or customized items just by texting those item ids, separated by comma ",", or any other defined separator, these text orders to default store for the assigned number are as defined in 202, 206, 210, 214, 218.

Further end user can prefix the entire text/SMS order message with defined prefixes in 232 for Drive Through pickup or 234 for delivery to default address defined in the user profile, which can be changed at any time, to designate the destination of order delivery if it is not in store pickup. In store pick is the suggested default delivery of order for all the text/SMS orders, this default can be changed as needed.

Case (capitalization or non-capitalization) of text sent by end user for interaction such as ordering or other data retrieval or confirmation send, does not cause any concern to processing server, processing server will treat and consider either capitalized or non-capitalized text equally.

To approve the order and confirm the payment for the order, end user has to send the text message with only confirmation word/code 224 defined by the user to the same assigned phone number to which the text order was sent, after receiving the order information and payment amount as text messages 304, 306. The conformation word/code 224 can be any word or code defined by the end user in the user profile to confirm the order texted to a particular assigned phone number. End user can customize different confirmation word/code for each assigned phone number. Processing server can default the confirmation word/code to "yes" if end user so chooses. After the confirmation word/code is sent by the user, processing server verifies the information in temp database, processes the payment using the preset payment and sends out order confirmation and other details as in text/SMS message 314 and 308, or 310.

End user also has a PIN (Personal Identification Number) to protect entire user profile. End user sets up the PIN when creating the user profile initially, the PIN can be changed by user at later time. PIN is used by end user to access the user profile, set up or change or add new payment method, or change any other information on user profile by clicking on the link provided in various text messages received by end user to access profile.

End user can send text/SMS message with specific designated word to assigned phone number to retrieve specific information from the default store for that assigned phone number. Representative designated words 226 are "menu" for retrieving menu of items including the customized items by the end user for default store for the assigned phone number, "table" to reserve a table at the default store or restaurant, "appoint" to get an appointment for the service from the default store. End user needs to append the symbol "@", followed by the store id, if the requested information is from a non-default store or user does not have a user profile. When the end user sends the text/SMS to assigned phone number with designated word 226 processing server responds with text/SMS with data retrieved for request as in 312, 318, or 320.

End user with user profile and preset payment method in user profile, can also order in conventional way at a restaurant, coffee shop or any other store that sells products or services and that has a specific phone number assigned for text ordering purposes associated with the system. For such conventional orders, end user can choose to pay with a text message by texting the designated symbol "$" 228, or any other defined symbol, followed by the dollar amount with two decimal places for cents to be paid to the store, followed by symbol "@", or any designated symbol, if the store is not default store, followed by store id of that store location. Processing server processes the payment with preset payment method, and sends user a text/SMS and an email of payment confirmation 316 to the store, payment is sent to.

Figure 4A:
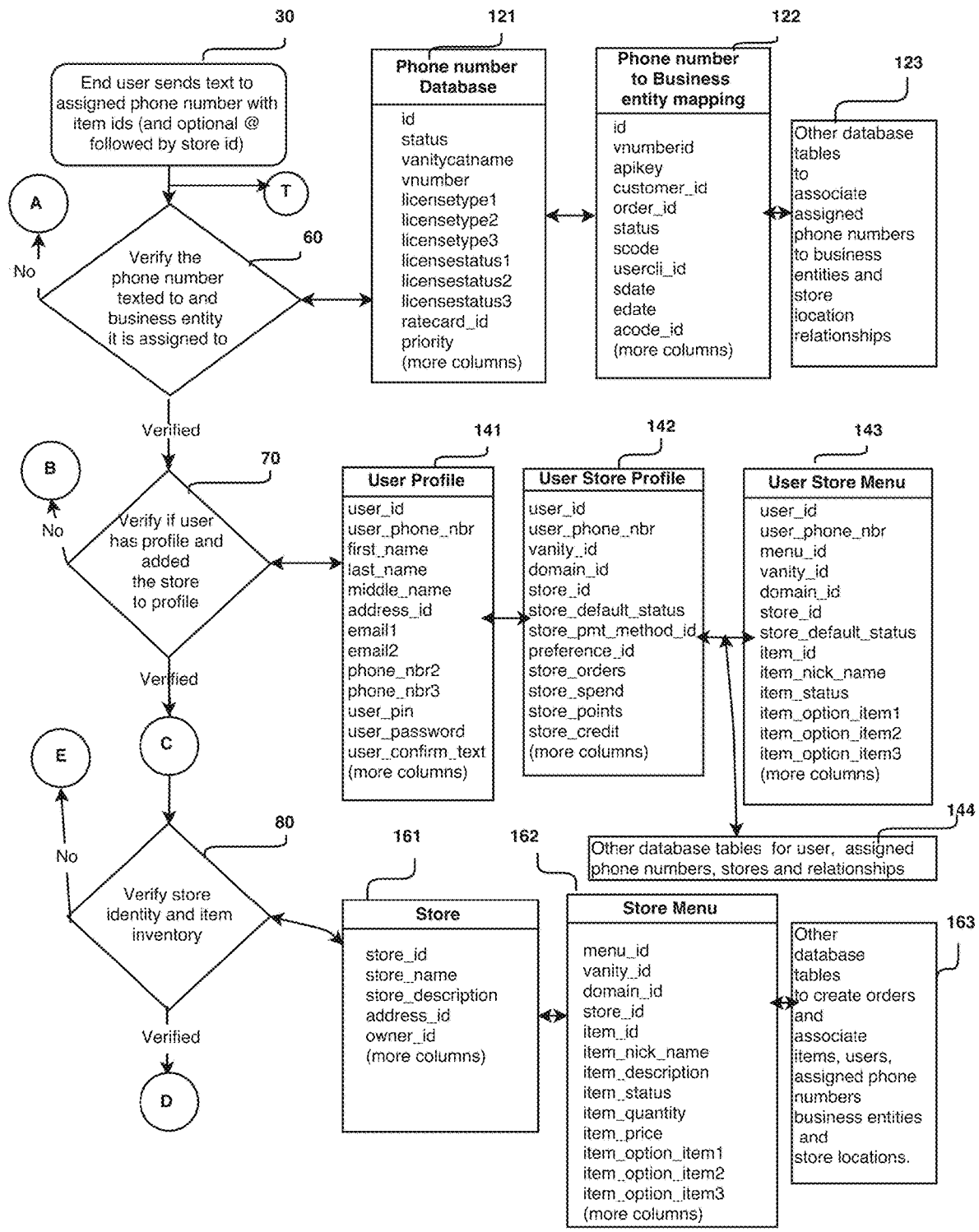
FIG. 4A, FIG. 4B and FIG. 4C are detailed process flow diagram of an embodiment of invention with sequence of steps and interaction between the end user mobile device sending and receiving text/SMS message and the processing server's logic, database tables, and components involved.
Figure 4B:
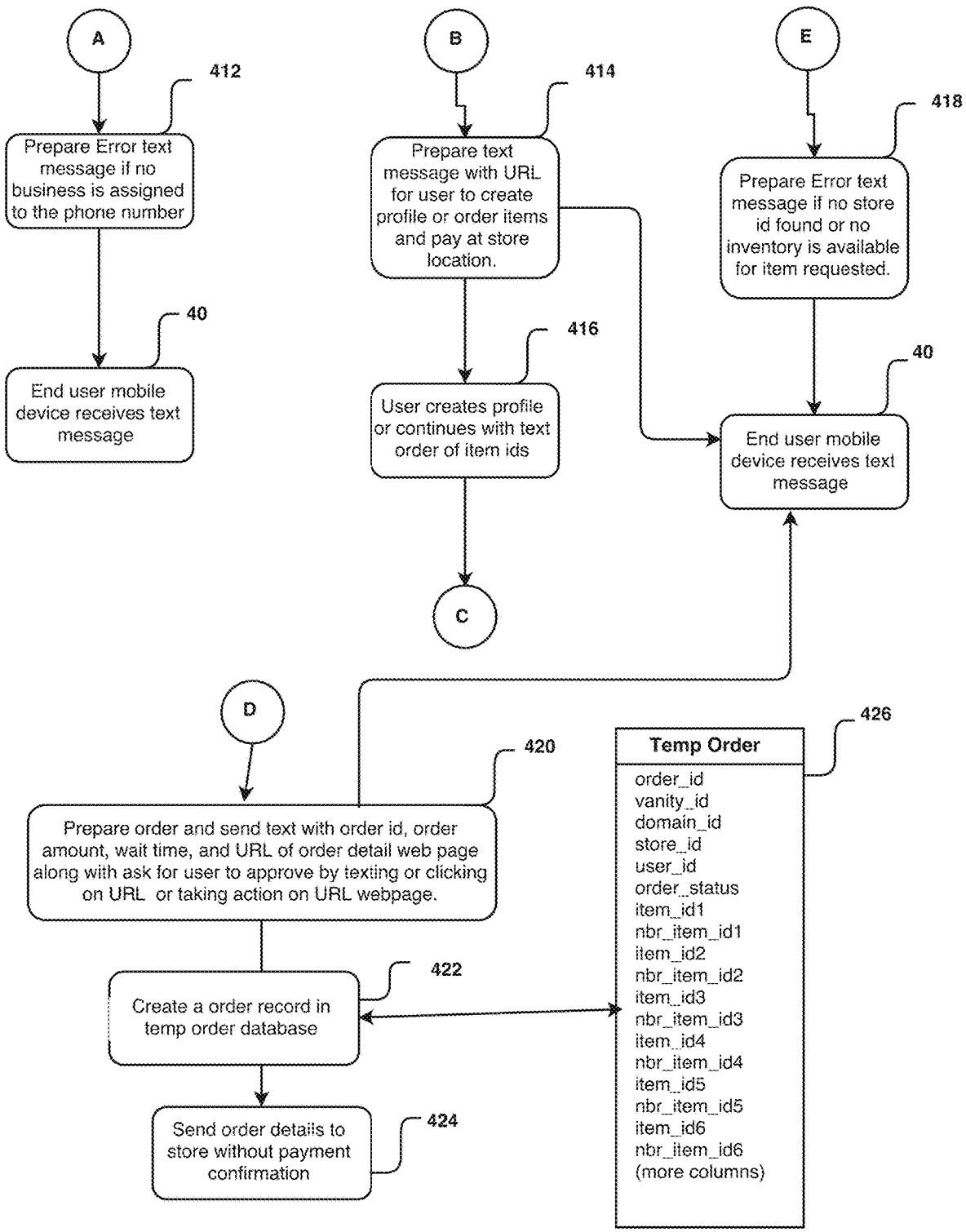
Figure 4C:
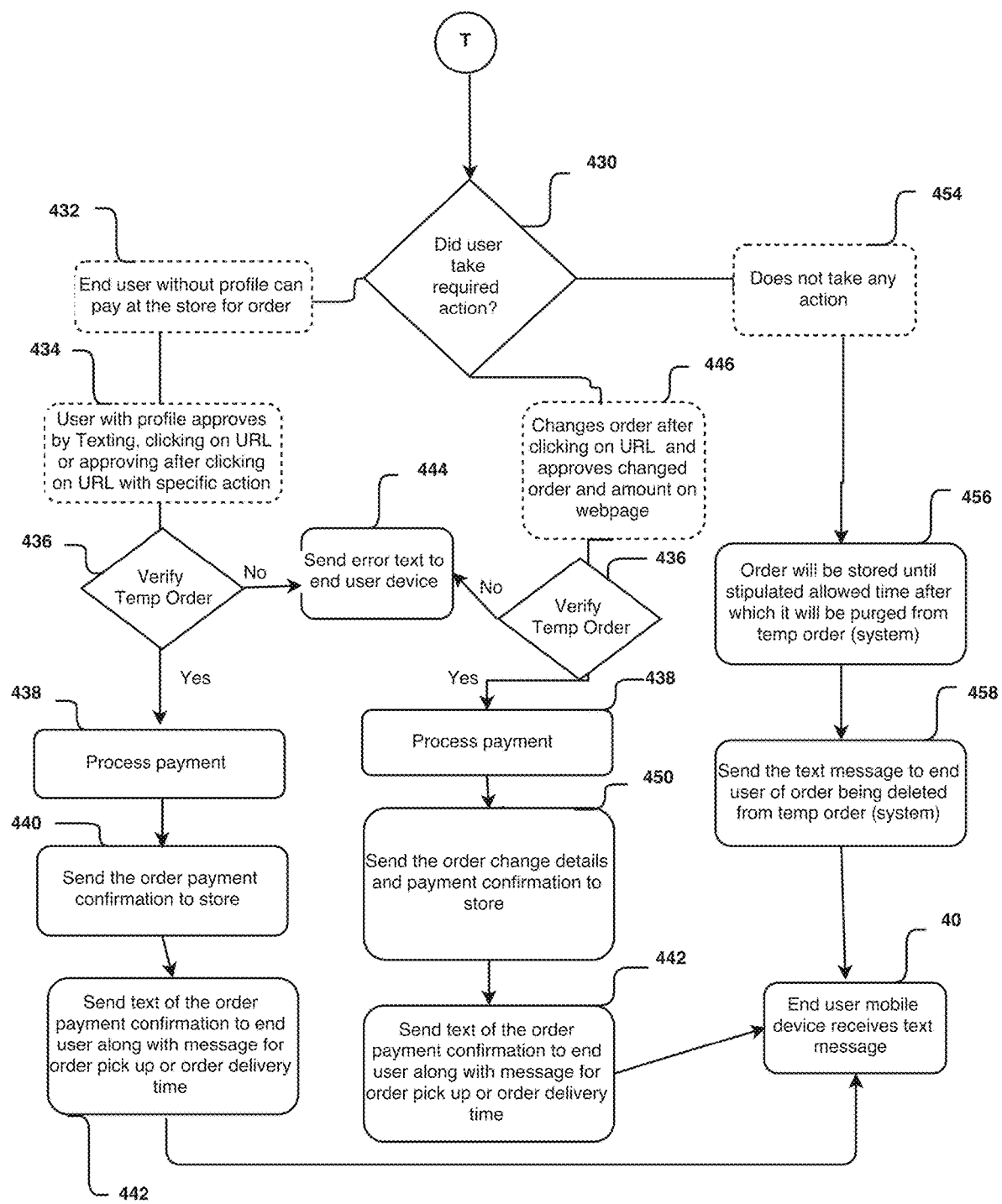

End user with or without user profile can text a zip code 230 to an assigned phone number on the system to retrieve the store location information of stores associated with such assigned number in and around the zip code texted by the end user, as a response with URL in single text/SMS 322 by the processing server. End user can click on the URL and access any of the services provided by any of those stores displayed by the URL web page. End users with user profiles are only allowed to complete the order or request service or transmit user information to a store for specific order or service, for such order completion end user needs to provide the end user's phone number and PIN at designated stage in ordering process. End users without user profiles are prompted to create their user profiles to order from listed stores on URL web page. FIG. 4A, FIG. 4B and FIG. 4C depict the details of an embodiment of the processing server 10. After the end user sends any text/SMS message 30, weather it is text/SMS order message with prescribed format as in FIG. 2 202, 204, 206, 208, 210, 212, 214, 216, 218 or 220 with or without prefix as in 232 or 234 or any other message such as confirmation word/code 224 or Designated word 226 or zip code 230, processing server first verifies using logic block 436 if there is any temp order record in temp order database table 426 containing both end user phone number which is used for identifying the end user and the phone number texted to (assigned phone number to store). If there is temp order record present then, the end user text 30 is validated against the confirmation word/code 224 and if it matches then processing server proceeds to process the payment with preset payment method 438 and sends out the order details with updated payment status to store 440 or 450 and also prepares the text message with order information 442 to send to the end user which end user receives 40.

If there is no temp order found in database table 426 then the processing server proceeds to logic block 60 to validate the phone number texted to and business entity with store location assignment of the phone number texted to, using database tables among them are 121, 122, and 123. If the validation fails then the processing server prepares the text 412 and sends it to end user, which end user's mobile device receives 40.

If the above said validation assigned phone number and business entity with store location is successful, processing server moves to validate user profile and default store using logic block 70 and various database tables, among them are 141, 142, 143 and 144. If validation fails then, processing server prepares a text to prompt end user to create profile 414 and sends the text/SMS, which is received by end user 40. End user either creates profile or continues to use text ordering system by paying at the store after text ordering 416.

If the above validation of user profile is successful, processing server moves to validate store identity and inventory at store for requested items using logic block 80 and various database tables, among them are 161, 162, and 163. If validation fails then, processing server prepares the appropriate error text 418 and sends the text/SMS, which is received by end user 40. End user at this point re orders with correct text content. If the above validation of store identity is successful, processing server prepares the order information text 420 for approval of end user, this order information text includes order id, amount, wait time and URL of complete order details and asks the user to confirm the order for payment processing. The order details record 422 is inserted in temp order database table 426 and order details are transmitted to store terminal 424 as unpaid order to gather and have needed stuff ready to prepare order at store after confirmation.

Now end user without profile has options to either pay for the order at store 432 or do nothing 454, or create the profile by clicking on the link sent to end user for order information 304 of FIG. 3A. End user with profile has three options, one to confirm the order 434, second to change the order by clicking on the URL and modifying the order on web page 446, or do nothing 454.

If end user does sends the confirmation word/code 224 as only text as text/SMS to the assigned phone number then the processing server first verifies using logic block 436 if there is any temp order record in temp order database table 426 containing both end user phone number which is used for identifying the end user and the phone number texted to (assigned phone number to store) and also accounts for store id to validate end user text 30 is against the confirmation word/code 224 for such store id, and if it matches then processing server proceeds to process the payment with preset payment method 438 after payment processing confirmation the temp order table entry for that record is moved to orders table, and sends out the order details with updated payment status to store 440 and also prepares the text message with order conformation 442 and sends text/SMS to the end user which end user receives 40.

If however the temp order record is not found then an error message is prepared and send to the end user 444.

When end user changes the order by clicking the URL and modifying the order details 446, the changed order information is also updated in the temp table 426, upon completion of order change the processing server verifies the temp table for end user phone number and assigned phone number along with order id, and if record is found, then it proceeds with payment processing with preset method 438 after payment processing confirmation the temp order table entry for that record is moved to orders table, and the order conformation with payment and order changes is sent to the store identified 450 also the end user gets order and payment confirmation text/SMS and email 442. If the temp order is not found then an error text message 444 is sent to the end user.

If the end user does not take any action 454 after end user receives the order information text within stipulated time 456, an order cancellation text message is prepared 458 and sent to the user 40, temp order table record for that order is deleted.

Figure 5A:
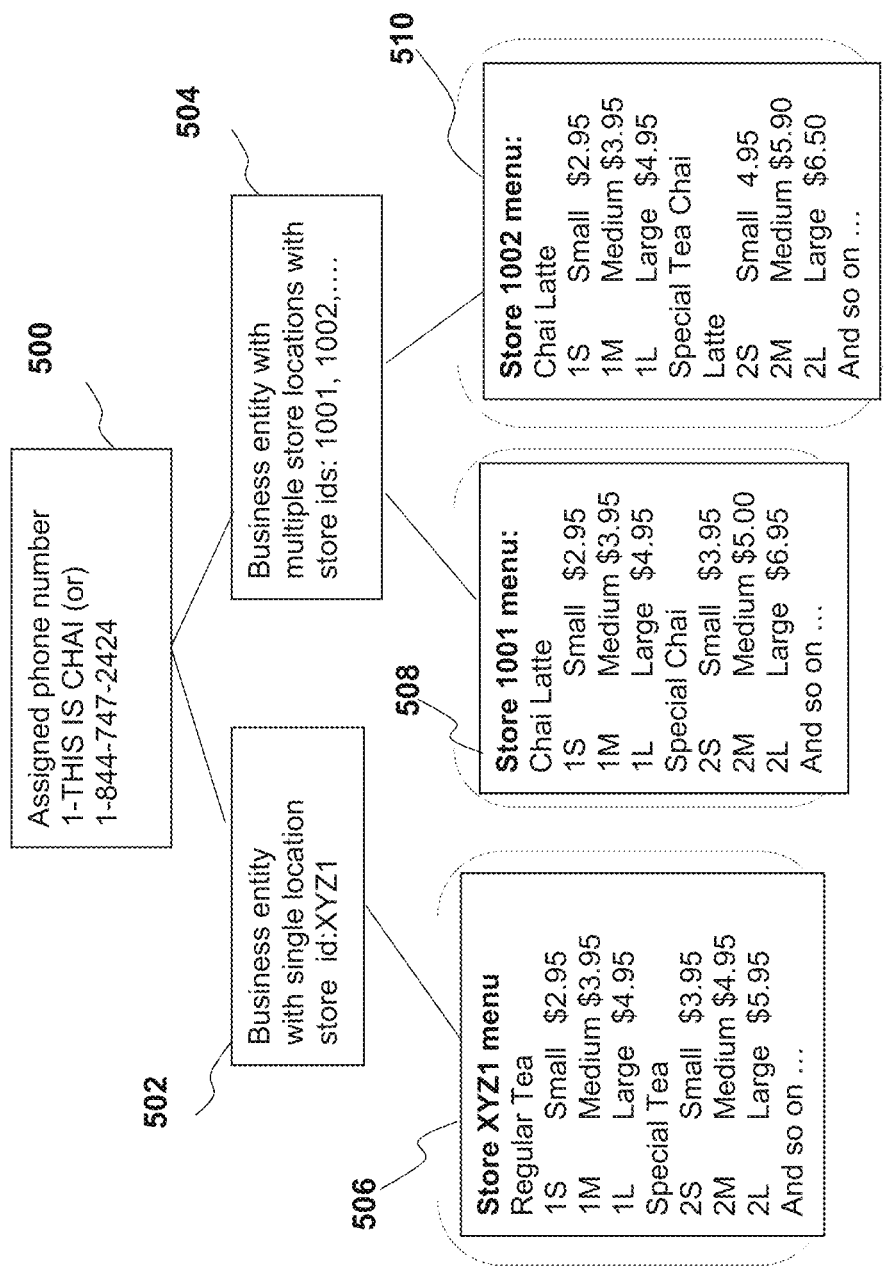

FIG. 5A and FIG. 5B shows an embodiment and practical use case of the invention in a beverage store serving variety of CHAI. The assigned phone number 500 is assigned to two business entities, one business entity with one store location 502 and other business entity with two or more store locations 504 both these entities are using the same common assigned number as their business activities are about same and they are in same line of business. The combined store count for this assigned phone number is three or more, for practical purposes three stores are depicted with three different menus 506, 508 and 510.

FIG. 5B depicts the text message exchange between the end user without user profile and the processing server 512. End user without profile orders two items at various stores identified by store id, and the processing server responds with the order number total and where to pay the money or create user profile in blocks 514, or 516 or 518.

FIG. 5C depicts the text message exchange between the end user with user profile which has one store as default store out of three stores 520. End user with profile orders two items using text/SMS at non default store for the assigned phone number, identified by store id, and the processing server responds with the text/SMS message with order number and amount and options to confirm the order by text or URL click or modification of order by clicking on a URL and approval thereof, user chooses to send the text/SMS with user defined confirmation word to approve the order and processing server completes the transaction and by charging the card for said amount, and sends out text/SMS confirmation message to user 522. The order details are also transmitted to the store id identified.

End user with profile orders same two items using text/SMS at non default store for the assigned phone number, identified by store id, and the processing server responds with the text/SMS message with order number and amount and options to confirm the order by text or URL click or modification of order by clicking on a URL and approval thereof, user chooses to click on URL with touch of finger on smart phone device and modifies the order and approves the order, after approval processing server completes the transaction by charging the preset payment method for said amount, and sends out text/SMS confirmation message to user 524. The order details are also transmitted to the store id identified. End user with profile orders same two items using text/SMS at default store for the assigned phone number, and the processing server responds with the text/SMS message with order number and amount and options to confirm the order by text or URL click or modification of order by clicking on a URL and approval thereof, user chooses to send the text/SMS with default confirmation word which was not modified by end user in profile to approve the order and after approval, processing server completes the transaction by charging the preset payment method for said amount, and sends out text/SMS confirmation message to user 526. The order details are also transmitted to the store id identified.

To further elaborate the invention, representative wire frame and screens are provided in following figures.

FIG. 6A is representative screen for the user profile registration, this screen has several input fields along with address entry fields where user may want the order to be delivered, first address added will be marked as default automatically, a button to add more addresses, a button to view the added stores and system assigned phone numbers to which user has sent text/SMS in the past and stores the user has interacted using such system assigned phone numbers, a button for menu item customization derived from store items, and a button for payment details.

FIG. 6B is representative screen for adding additional addresses of the user where user may want the delivery, user can also select one of these addresses as default address.

FIG. 6C is representative screen to view all the system assigned phone numbers and associated stores that user has already interacted. User does not add any new store details here, but instead the phone number and store is automatically added when the user sends a text/SMS to an assigned phone number with store id or keyword provided by the store. User selects the order phone number (assigned phone numbers) and can see the stores user has communicated in the past. User however can customize the store name, store id, mark a store as user's default store and also customize the confirmation word for any listed stores here. User can also access any store's menu listed here and further customize any of the items from any store by clicking on the store's menu button with a touch of finger or stylus.

FIG. 6D is representative screen for the store's menu listed in user profile, user can select the order phone number (assigned phone number) and it will list all the stores user has interacted with, in the past, with such assigned phone number, upon selecting one of the stores, user can see the store details and menu items from that store. Any of these store menu items can be customized if customization is allowed on such store menu items, and also user can customize the item number of customized menu item, and customize the nick name. All customization will be saved in user's profile database, so when user orders from such store, user can text/SMS order customized item ids or regular store item ids.

Figure 6E:
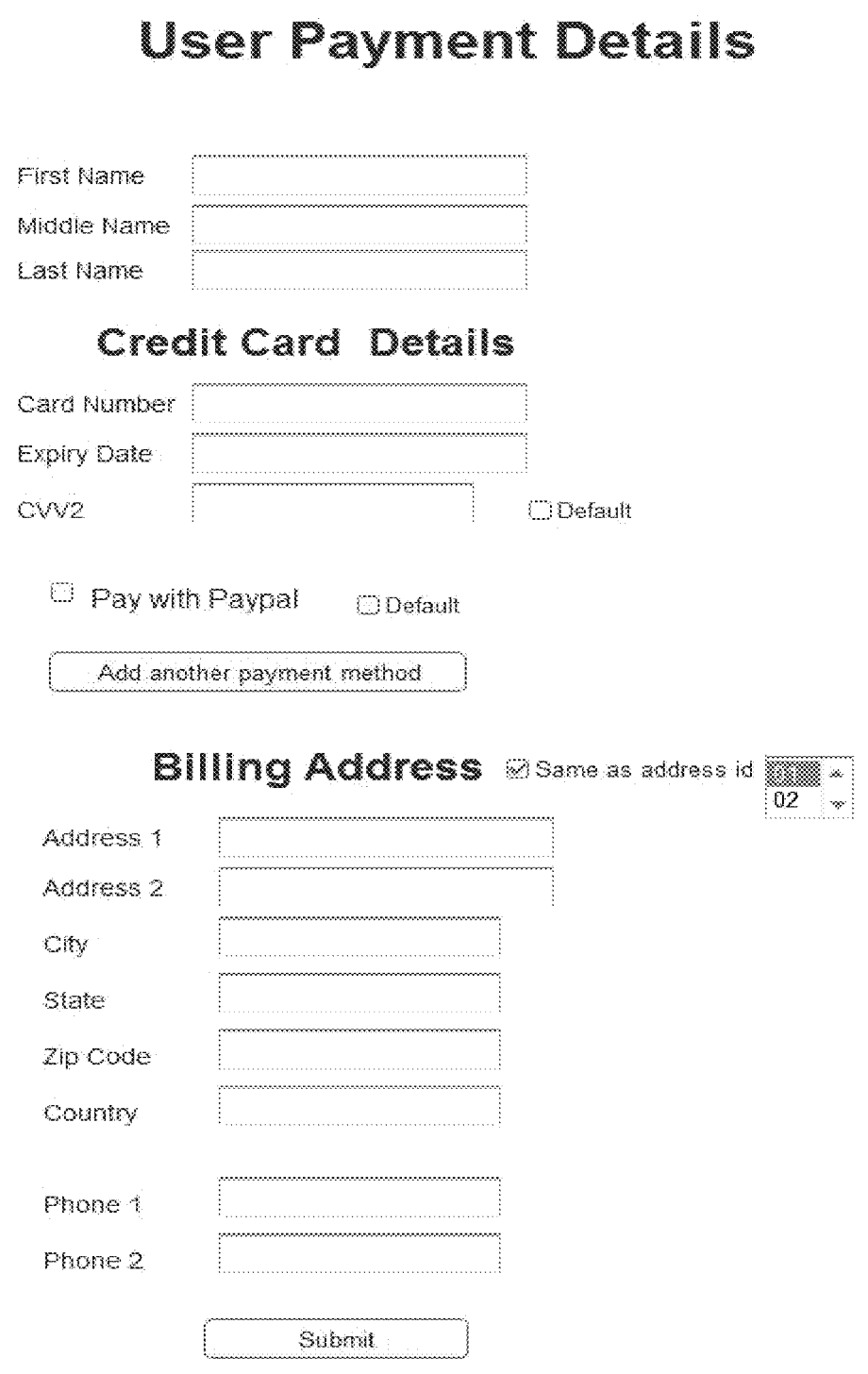

FIG. 6E is representative screen for the inputting the payment details by the end user, which can be changed at later time. It allows for making one of the payment method as default payment method, also it allows to choose the billing address as one of the addresses already keyed in, in prior screens.

FIG. 6F shows the representative screen of web order that can be modified by clicking on the URL received by user in text/SMS message as a response to text/SMS order to an assigned phone number. User can add more items or further customize the items to be ordered. User can also customize the items for future text/SMS ordering, customize store details or make the store as default store, only one store can be default at any given time. Once the order is modified, user can click on submit to approve button by touch of finger or with stylus.

FIG. 6G shows the representative screen of results web page when user sends a texts/SMS a zip code to an assigned number in system to find the stores associated with that assigned phone number in and around that zip code, with all the options available to interact with each such found store, such as to order from or reserve a table, or book an appointment. The buttons provided for menu and reservation of table or appointment, when clicked, will show further screens to complete the requested action. Also user can change the zip code or enter an address to modify the search and new result set will be shown to the user in this mobile ready web page.

FIG. 6H shows the representative screen of order history page and receipt image of all such orders that user has placed by text/SMS message to any of the assigned numbers which are associated with any of the stores and business entities. User just has to click with touch of finger or stylus on order id to see the image of the receipt as provided.

FIG. 7A is representative screen for the business entity registration and the available system phone number assignment to the business entity, all the stores for that business entity will have the same assigned phone number, the business entity selects their line of business to find out available phone numbers they can choose from. This screen also features a button to add contacts, besides the business entity name and address fields to input, a button for adding the business entity's core menu and a button for adding store locations.

FIG. 7B is representative screen to add store operators, admins, and other users that can login to the system to manage the operations of text ordering system and menu items, pricing etc. Business entity admin or store admin selects the store for the assigned number and enters the details of the contact, operator or admin for the store.

FIG. 7C is representative screen for the menu item creation and management. Core menu is for entire business entity's template menu to use, and individual stores can modify the core menu for their individual stores, add or subtract from the core menu and save as store menu. Store's item quantity is adjusted after each item is ordered from the store. If the business entity uses their own menu and inventory system, there is button to provide the API or import of the data from the said system.

FIG. 7D show the representative screen for business entity's store registration, based on the store location, tax rates need to be entered for the appropriate fields. Assigned phone number is pre populated and Input fields include store name, address, phone email sales taxes and admin user and password for store.

FIG. 7E shows the representative screen of orders received by store and interactions with the order data at store. This order display system is for the preparers of order to see and quickly prepare the order as they look at screen. The order display screen would be touch screen to allow order preparers to interact with the screen data by touching with finger to change the order status as they go through the orders. The delivered orders are automatically rolled to the bottom and new paid orders are shown at the top. The screen also has button to view pending orders which are not yet paid by the user, a button to view abandoned orders which are past the stipulated time since they are texted but not paid yet, and a button to check the orders of the preparer. The orders have the buyer name automatically populated to help preparer call out the buyer name once the order is ready for pickup.

FIG. 7F shows the representative screen of user or operator login to the store to start viewing the orders available to work on, or admin to manage users or supervisor to run reports and see the store operation in real time. The fields require to login are the assigned phone number, store id, user id and password.

FIG. 7G show the representative screen for admin or business entity admin dashboard with accessible menu items for the admin type that can be configured for each admin or user type.

Figure 7H:
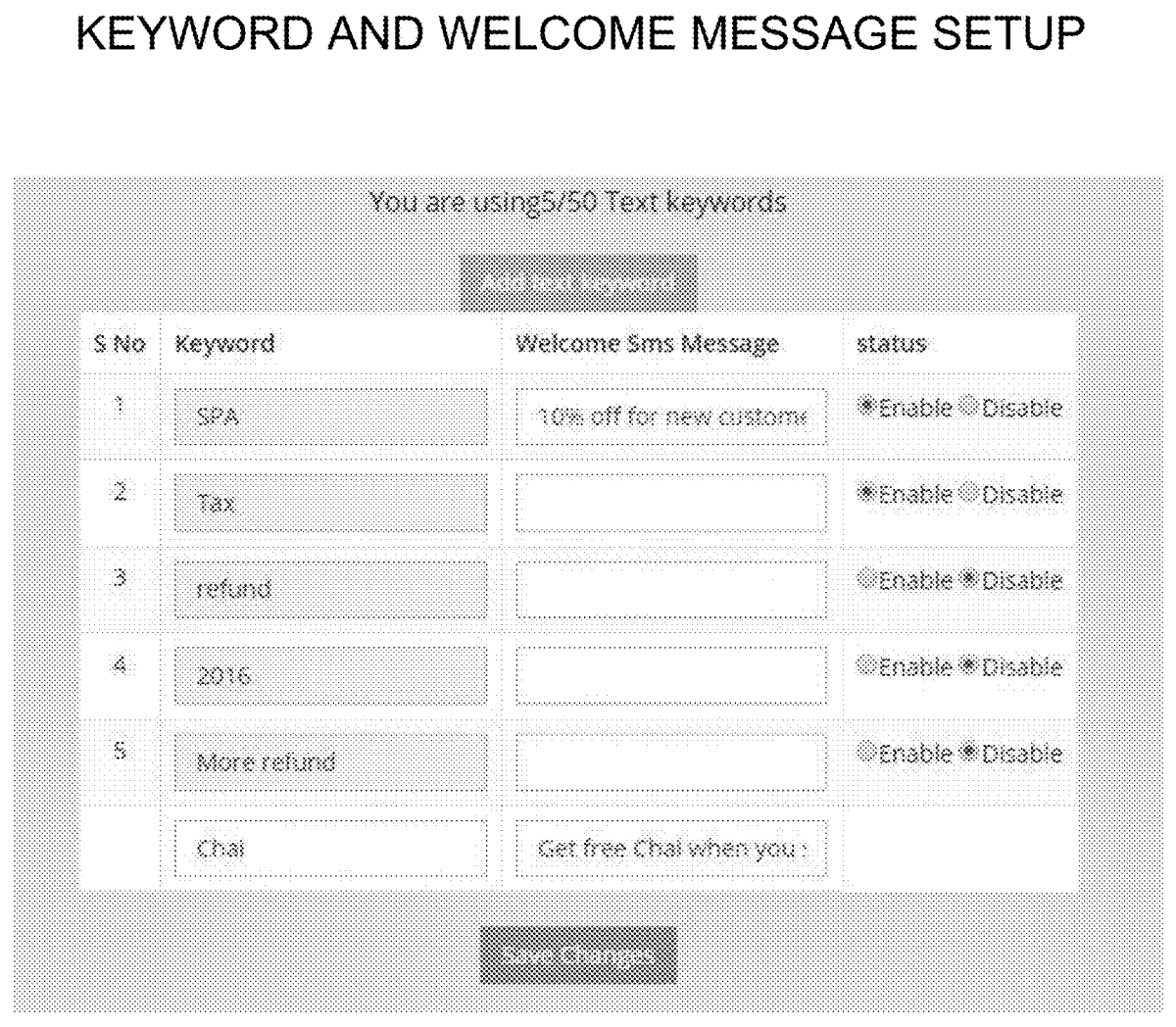

FIG. 7H shows the representative screen of keyword creation/management and text message that will be sent out to the user who text such keyword. Each store can have multiple keywords and associated text messages that can be sent to the user upon user sending the text/SMS message to the assigned phone number with just only such keyword in text/SMS message.

What is claimed is:

1. A system for ordering items, products or services, in earth friendly way, without having to print receipts and with minimal in-person communication between end user and store personnel, by using text or SMS messaging from text enabled and internet ready device, the system comprises of:
   a database of plurality of text enabled phone numbers;
   the text enabled phone numbers in the database are mapped or connected to Text Messaging server with both Text Messaging and SIP trunk capabilities,
   each phone number from the database is assigned to a plurality of business entities with one or plurality of store locations, or is assigned to a group or chain of business entities each with at least one or plurality of store locations, all business entities and their store locations to which the phone numbers are assigned to, conduct similar business activities or are in the same business industry, and
   a processing server hosting the database of at least one or plurality of said assigned phone numbers, and a database of business entities with a plurality of store locations to which said phone numbers are assigned to, the processing server is connected to Text Messaging server to send and receive texts,
   the processing server connected to SIP trunk provider for voice orders, and
   the processing server hosting the end user profile and the end user details, relationships between the end user and plurality of said assigned phone numbers, business entities and their store locations, the end user preset payment method to one or plurality of business entities and their store locations, and
   the system allowing the end user to send text or SMS to said assigned phone number, with at least one or plurality of item IDs to order items, products or services from one of the stores said phone number is assigned to,
   the processing server configured to identify the assigned phone number, identify business entity and store location said items, products or services were ordered from, identify the end user and items that the end user ordered, and send a text or SMS to the end user with an order information and ask for approval or confirmation from the end user, and allow the end user to pay the order amount at the store or approve the order by sending a designated text/SMS message to the same assigned phone number,
   or by visiting a designated URL provided for approval within a stipulated time to allow the processing server to process a payment using the preset payment method, and
   the processing server configured to route the approved and paid order to an identified store, and send out a receipt to the end user's mobile device as text, SMS or MMS or text and web URL in a single text/SMS and/or email, and
   to allow the end user to pick up the order from the identified store or deliver the order from the store to the end user's predefined address.

2. The system defined by claim 1 wherein the end user is not required to do a one-time initial setup of user profile.

3. The system defined by claim 1 wherein the end user with or without user profile is allowed to send a text/SMS to store location's assigned phone number with a specific Keyword provided by the store location to automatically add that store location to the user profile and receive discounts or promotions from that business entity or store location, and if it is the first store location with assigned phone number, that user has sent the text/SMS to, then that store location is added as a default store location to the existing user profile, or a new user profile is created with the user's phone number, and that store location is added to the user profile as a default store location for that assigned phone number.

4. The system defined by claim 1 wherein the end user is allowed to setup a user profile, add a default/preset payment method, create customized items, products or services derived from store location's menu items, by filling in a web form, with information such as name, address, credit card or other electronic payment method, PIN (Personal Identification Number), and customize available items, products or services and/or add options, and other preferences such as preferred delivery address, and also select a default store location for each assigned phone number associated with plurality of store locations, from where the end user wants to order products or services.

5. The system defined by claim 4 wherein the web form can be accessed by the end user on web, or mobile app or by sending a text/SMS to the assigned phone number with a specific keyword and receiving a URL in response text message supplied back by processing server to the end user's text enabled and internet ready device.

6. The system defined by claim 1 wherein the end user is allowed to create plurality of customized item IDs by providing user defined labels or names to the corresponding products or services associated with store menu item IDs.

7. The system defined by claim 1, wherein the end user with user profile is allowed to place an order from a default store location associated with assigned phone numbers by sending text/SMS to the assigned phone number, with at least one or plurality of default store location's menu item IDs, or at least one or plurality of default store location's user customized item IDs or labels or names, or combination thereof, each item ID separated by the designated separator symbol.

8. The system defined by claim 1 wherein, the end user with a user profile is allowed to place an order for store menu item IDs at any other store location other than the default store location for the assigned phone number, using the preset payment method defined in the user profile by sending a text to such assigned phone number to such store location, with at least one or plurality of such store location's menu item IDs, or at least one or plurality of such store location's user customized item IDs or labels or names, or combination thereof, each item ID separated by a designated separator symbol, followed by a designated store indicator symbol followed by the store ID for such store location.

9. The system defined by claim 1 wherein, the end user can order multiples of same item id by prefixing the item ID with quantity followed by a designated multiples symbol.

10. The system defined by claim 1 wherein, the user is allowed to customize each store ID or store location with a numeric or alpha numeric name or label.

11. The system defined by claim 1 wherein, the order information is sent back to the end user for approval in text or SMS with order number, order amount, optional order ready time and a URL of web page with all order pertinent details in the same text/SMS message, the end user can reply back with text/SMS of user customizable confirmation word/code to assigned phone number, or click on the supplied URL for approval or make changes to the order and approve the changed order by specific instructions and defined actions on the URL web page.

12. The system defined by claim 1 wherein, the end user is allowed to send a designated keyword as text/SMS message to assigned phone number, to retrieve menu of products and services of the default store location set in user profile for that assigned phone number, as a response text message which includes a URL of web page listing menu of default store item IDs and user's customized item IDs for the default store location for that assigned phone number along with a description and pricing of each item ID.

13. The system defined by claim 1 wherein, the end user is allowed to send a designated keyword followed by a designated store indicator symbol as text/SMS to the assigned phone number of that store location, to retrieve menu of products and services of the store location other than default store location for that assigned phone number set in the user profile, as a response text message which includes a URL of web page listing menu of that store location's item IDs and user's customized item IDs for that store location for the assigned phone number along with a description and pricing of each item ID.

14. The system defined by claim 1 wherein, the end user can pay the default store location set in the user profile for an assigned phone number, using preset payment method by sending a designated payment symbol followed by the amount to be paid as a text/SMS message to the assigned phone number for that store location.

15. The system defined by claim 1 wherein, the end user can pay the store location other than the default store location set in the user profile for an assigned phone number, using preset payment method by sending a designated payment symbol followed by the amount to be paid followed by a designated store indicator symbol as a text/SMS message to the assigned phone number for that store location.

16. The system defined by claims 14 and 15 wherein, the end user's device will receive a text/SMS message with information of payment amount to the store ID, and in order to approve such payment, the end user is required to reply with a predefined confirmation word/code for that store or by clicking on provided URL in the text/SMS message received by the end user's device and taking specific actions to approve the payment to that store ID.

17. The system defined by claim 1 wherein, the end user is allowed to reserve a table or book an appointment for service at the default store location set in the user profile for an assigned phone number, by sending a designated booking symbol as a text/SMS message to such assigned phone number.

18. The system defined by claim 1 wherein, the end user is allowed to reserve a table or book an appointment for service at the store location other than a default store location, by sending a designated booking symbol followed by a designated store indicator symbol as a text/SMS to such assigned phone number.

19. The system defined by claims 17 and 18 wherein, the end user's device will receive a text/SMS message with URL of curated webpage which includes the availability of the store location's table spaces or appointment times for the defined services, which the end user can select and finalize the table reservation or finalize the appointment of any of the defined services by that store location.

20. The system defined by claim 1 wherein, the end user is allowed to interact with participating business entities or store locations of an assigned phone number by sending a five-digit zip code as a text/SMS message to such assigned phone number from the text enabled and internet ready device.

21. The system defined by claim 20 wherein, the end user's device will receive a text/SMS message with URL of curated webpage which includes store names, store IDs locations, distance from the zip code provided by the end user, and available options to interact with each of said store locations, including ordering items, reserving a table, or setting an appointment for a service, paying for items or service with a new or a preset payment method defined in the user profile, of participating store locations in and around the specified zip code.

22. The system defined by claim 20 wherein, the end users with user profiles are allowed to complete the order or request the services, or transmit user information to a store for specific order or service, for such order completion the end user is allowed to confirm information by providing the end user's phone number and/or PIN at a designated stage in placing the order or a service request process.

* * * * *